F. G. WHEELER.
ELECTROLYTE FEEDING DEVICE.
APPLICATION FILED JUNE 18, 1917.
1,269,666.
Patented June 18, 1918.
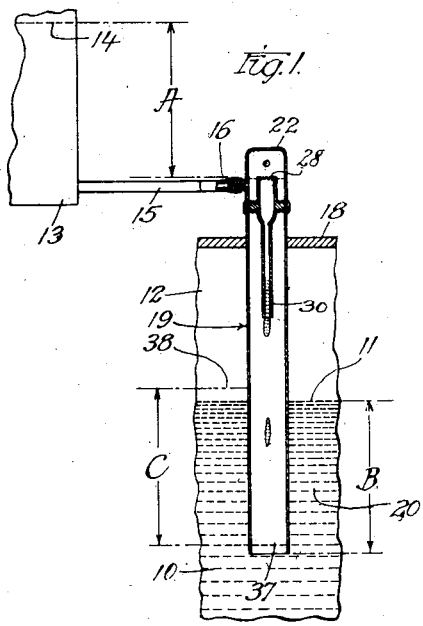
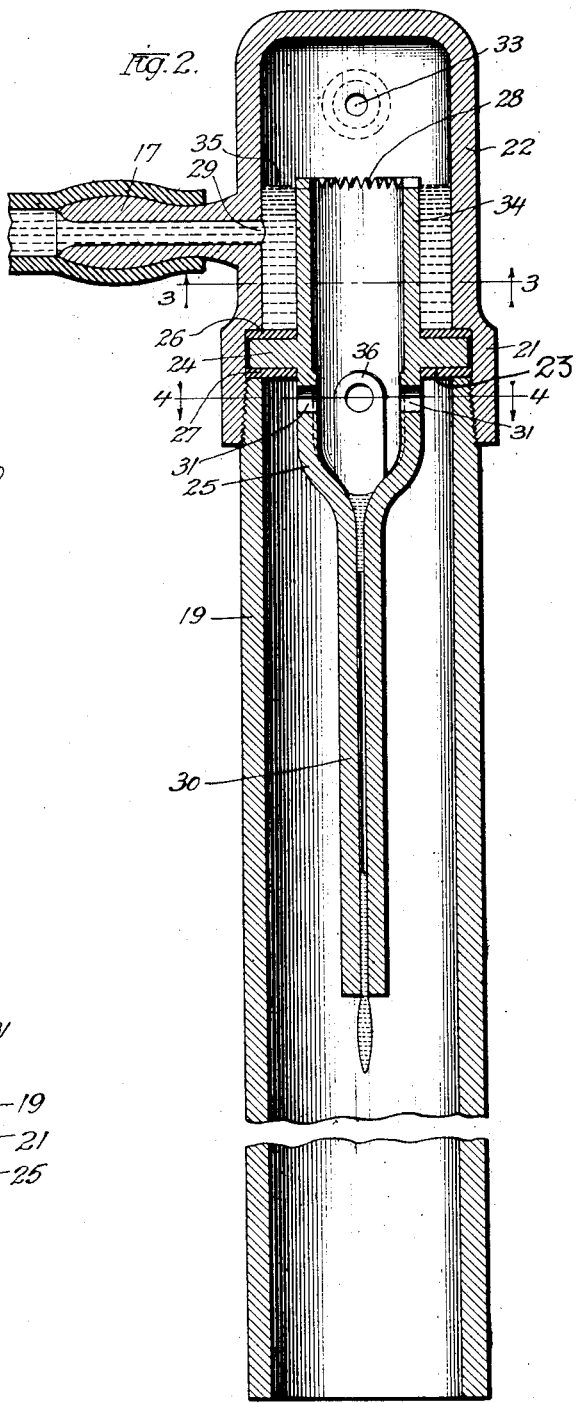
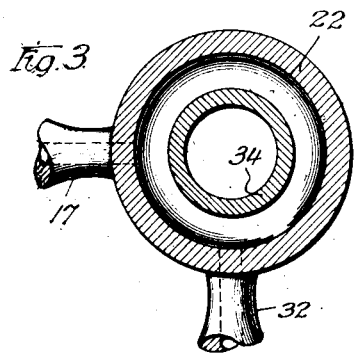
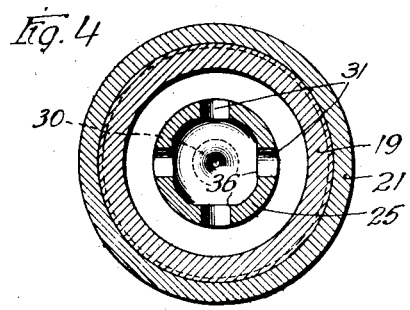
Witnesses:
Robert S. Weir
Arthur W. Carlson
Inventor
Frank G. Wheeler
By Offield Towle Graves & Offield Attys

UNITED STATES PATENT OFFICE.

FRANK G. WHEELER, OF APPLETON, WISCONSIN, ASSIGNOR TO BLEACH PROCESS COMPANY, OF APPLETON, WISCONSIN, A CORPORATION.

ELECTROLYTE-FEEDING DEVICE.

1,269,666.   Specification of Letters Patent.   Patented June 18, 1918.

Application filed June 18, 1917. Serial No. 175,266.

*To all whom it may concern:*

Be it known that I, FRANK G. WHEELER, a citizen of the United States, residing at Appleton, in the county of Outagamie and State of Wisconsin, have invented certain new and useful Improvements in Electrolyte-Feeding Devices, of which the following is a specification.

My invention relates to improvements in electrolyte feeding devices, and is particularly suitable for use where there is a number of cells, for instance a battery, in series to be supplied with electrolyte from a single source of supply.

The principal objects of the invention are to provide a device of the class described so organized that it will supply to an electrolytic cell a regular and sufficient flow of electrolyte to maintain the electrolyte in the cell at the required level; to provide a construction which will be non-clogging, due to the presence of foreign matter; to provide a device in which the danger of overflowing a cell is reduced to a minimum; to provide a construction in which there is no danger of the electrolyte evaporating and thereby depositing or precipitating solid matter which might cause improper operation of the device; to provide an arrangement of the class described such that where a pair of cells in series are fed from a common source of supply, the electrolyte is delivered to the cell in a broken stream or separated quantities, so as to prevent improper flow of the electric current; to provide a device of the class described which shall be simple and economical to manufacture, while being efficient and inexpensive to maintain and operate; and, in general, to provide an improved electrolyte feeding device of the character referred to.

As a specific application of my invention, I shall illustrate and describe an apparatus for supplying with brine the cells employed for the purpose of electrolyzing saline solutions to produce chlorin and caustic soda.

In the drawings accompanying this application—

Figure 1 is a fragmentary, somewhat diagrammatic view, showing the general arrangement of my improved device;

Fig. 2 is an enlarged vertical section of the principal part of the apparatus shown in Fig. 1;

Fig. 3 is a section taken on the line 3—3 of Fig. 2; and Fig. 4 is a section taken on the line 4—4 of Fig. 2.

In the drawings, 10 represents fragmentarily an electrolytic cell in which the electrolysis of the brine is effected by current passing between suitable electrodes (not shown). 11 designates the level at which it is desired to maintain the electrolyte in the cell so as to secure the best operating results. It is understood that chlorin as generated, passes off into the space 12, from whence it is conducted by suitable pipes to the bleach or other equipment, it being understood that said gas in the space 12 is substantially at atmospheric pressure, although of course the top of the cell is covered over and suitably sealed to prevent egress of noxious vapors.

Although it is conceivable that artificial pressure may be utilized to secure a free flow of the brine to the cell, I prefer to utilize the natural force of gravity; and to this end I locate the brine supply tank 13 higher than the height of the cell 10. Any suitable means, such as a float valve (not shown), may be employed to maintain the brine in the supply tank 13 at a constant level 14. There is of course no special objection to the employment of a float valve in this instance, for the reason that the supply tank is arranged to serve and supply with brine a large number of individual cells similar to 10, so that the stream of brine entering the supply tank 13 is of considerable dimensions, and hence capable of being controlled by a float arrangement. The supply tank 13 delivers its supply of brine to each of the cells 10 through a feed pipe 15, the cell end of which is equipped with a flexible rubber terminal portion 16 arranged to fit over the nipple 17 of the principal part of the device, which will now be described.

Vertically disposed in the cell 10, extending through, and sealed in, the roof 18 of the cell, is a pipe 19, the lower end of which is immersed the required distance in the electrolyte 20 of the cell. The upper end of said pipe 19 is threaded to screw into the socket 21 of the bell 22. Between the upper end of the pipe 19 and the shoulder 23 in said socket 21 there is interposed a flange 24 formed as an integral part of the feed funnel 25. To secure a gas-tight joint between said flange 24 and the bell 22, in the end of the pipe 18 I prefer to insert flexible gaskets 26 and 27 at either side of said flange.

The upper end of the funnel 25 is extended upwardly a sufficient distance above the flange 24 to bring the upper serrated edge or mouth 28 a short distance above the port 29 in the nipple 17. The lower end of said funnel 25 is also reduced in diameter and extended downwardly so as to provide a long down-tube 30, the lower end of which, as shown in Fig. 1, is, however, a considerable distance above the bottom end of the pipe 19. In addition to the down-tube 30, communication between the interior of the pipe 19 and the interior of the bell 22 is established by reason of a series of four equalizing ports 31 in the funnel 25 just beneath the flange 24. A second nipple 32 having a port 33 communicating with the upper portion of the interior of the bell 22 may be employed to conduct a supply of a suitable gas into the interior of the bell and the pipe 19 with which the latter communicates, as just described.

It will be understood that all parts of the construction which come in contact with the electrolyte are constructed of suitable non-corrodible and non-conducting material, such as hard rubber or bakelite, so as not to be chemically affected by the electrolyte or electrically affected by the cell current.

Describing the operation, when the device is in use, the brine admitted through the pipe 15 and port 29 fills up the interior of the bell 22 to the level of the bottoms of the serrations 28, the lower part of the bell chamber 22 being sealed by the flange 24 and the upper extension 34. The nipple 32 may be considered closed with respect to the normal operation of the feeding device. During such normal operation, the pressure of gas, for instance, air, inclosed in the interior of the bell 22 and pipe 19, which are sealed against the atmosphere, is such as to balance a height of supply liquid substantially equal to A (see Fig. 1); that is to say, the difference between the level 14 in the supply tank 13 and the level 35 of the liquid in the interior of the bell. In practice, of course, the pressure is very slightly less, so as to permit a steady flow of liquid from the tank 13. In order to maintain such pressure of gas within the sealed pipe 19, it is of course essential that the pressure of liquid at the bottom of the open lower end of the pipe 19 be equal to the pressure of gas within said pipe 19; otherwise, the gas would bubble out from the bottom of the pipe 19. Hence, it is obvious that the height B of the cell liquid above the bottom of the tube 19 is substantially equal to the feeding head A.

Assuming now that the level of liquid in the cell is lowered, due to the consumption of electrolyte, the pressure of gas in the pipe 19 will be correspondingly reduced, thus reducing the pressure of the said gas acting upon the surface 35 in the bell and permitting the liquid in the bell to overflow the serrations 28 and run down into the funnel. When the liquid thus runs down into the funnel 25 to feed the cell, it does not pass out through the transverse ports 31, by reason of the fact that there is a slight raised portion or facing 36 surrounding each port 31 and directing the brine through into the lower part of the funnel 25. By reason of the fact that the down-tube 30 is of very considerable length, as soon as the said tube 30 becomes full or nearly so, because of the head of liquid thus formed the liquid will flow out from the bottom of the tube much more quickly than it can be supplied by the overflow through the serrations 28, the result being that bubbles of air will be sucked in behind successive separated bodies of liquid passing down through the stem 30. As shown in Figs. 1 and 2, this results in a sectionalization of the stream of electrolyte passing out of the lower end of the stem or down-tube 30, and there is no possible opportunity for the electric current to pass out of the cell improperly.

In practice, a gentle flow of liquid through the notches 28 takes place substantially all the time, and thus the level of electrolyte in cell 10 is maintained constant. I have found, however, that it is necessary to make some allowance for the fact that the air or other gas contained within the pipe 19 and bell 22 has a tendency to dissolve in the brine, this resulting in a gradual rising of the cell liquid from the bottom of the pipe 19, as shown at 37. When this occurs, the level of liquid in the cell of course must rise to the height 38 so as to make the head C of liquid in the cell equal to the old head B, which, as previously stated, is always substantially equal to the supply head A. Hence, gradual solution and consequent diminution in quantity of gas within the pipe 19 and bell 22 would result in a gradual rise in the height of electrolyte within the cell. In order to prevent this occurring, compensating gas is fed into the bell 22 and supply pipe 19 by any suitable method. For instance, I may inject from time to time, or continuously, through the nipple 32 and port 33, small quantities of gas in amounts sufficient to more than offset the gas which is dissolved by the brine flowing through the device; or, the comparatively cool brine supplied may be saturated with dissolved gas, a certain percentage of which is given up as soon as the cool brine supply enters the bell 22 and pipe 19, which are comparatively warm, due to the cell temperature; or, the lower end of the pipe 19 may be positioned over an electrode so as to receive the bubbles of gas generated by the electrolysis.

Whatever method be adopted for supplying the compensating gas, it will be understood that the quantity supplied must be at least equal to the quantity which is dissolved by the brine. No bad effects result from a too liberal supply of compensating gas, the excess simply bubbling out from around the bottom of the pipe 19. When compensating gas is intermittently supplied through the nipple 32, the intervals between pumping gas into the bell must be sufficiently short to prevent any considerable rise in the height of the cell liquid.

When the liquid is flowing through the device to feed the cell, it will not deposit crystals of salt or other material upon the surfaces of parts of the device, for the reason that the solvent has no tendency to evaporate, owing to the fact that the body of gas contained within the device is sealed and not open to the atmosphere. There are no mechanical devices, valves, or other mechanisms, which are liable to get out of order, the arrangement being self-feeding and entirely automatic in operation.

It will of course be manifest that the described apparatus merely illustrates a single application of my invention, which may be embodied in widely differing forms in order to suit individual needs and requirements, without sacrifice of efficiency. Hence, the scope of the invention must be determined by reference to the appended claims.

I claim—

1. In apparatus of the class described, the combination of a supply tank containing liquid at a prescribed pressure, a consumption tank the liquid level of which is to be maintained, a conduit having its lower end immersed in the liquid of the consumption tank, and a pressure chamber having an overflow port communicating with the conduit and having a lower feed port communicating with the liquid of the supply tank.

2. In apparatus of the class described, the combination of a supply tank provided with an outlet, the pressure of liquid in said tank being maintained constant at said outlet, a consumption tank the liquid level of which is to be maintained, and a sealed conduit having one end connected to said outlet and the other end immersed in the liquid of the consumption tank, said conduit being arranged to inclose a body of gaseous fluid under pressure for the purpose of regulating the flow of liquid through said conduit.

3. In apparatus of the class described, the combination of a supply tank provided with an outlet, the pressure of liquid in said tank being maintained constant at said outlet, a consumption tank the liquid level of which is to be maintained, and a sealed conduit having intermediate its length an air-trap portion and having one of its ends connected to said outlet and the other end immersed in the liquid of the consumption tank and arranged to include in said air-trap portion a body of gaseous fluid extending from the top of the trap to the bottom of the open end of the conduit which is immersed in the liquid of the consumption tank.

4. In apparatus of the class described, the combination of a supply tank provided with an outlet, the pressure of liquid in said tank being maintained constant at said outlet, a consumption tank the liquid level of which is to be maintained, and a sealed conduit having intermediate its length an air-trap portion and having one of its ends connected to said outlet and the other end immersed in the liquid of the consumption tank and arranged to include in said air-trap portion a body of gaseous fluid extending from the top of the trap to the bottom of the open end of the conduit which is immersed in the liquid of the consumption tank, said gaseous fluid being under a pressure substantially equal to the depth of immersion of the open end of said conduit in the consumption tank, the pressure of liquid in the supply tank being suitably maintained in an amount sufficient to force liquid therefrom up to the overflow level of said trap.

5. In apparatus of the class described, the combination of a supply tank provided with an outlet, the pressure of liquid in said tank being maintained constant at said outlet, a consumption tank the liquid level of which is to be maintained, a sealed conduit having intermediate its length an air-trap portion and having one of its ends connected to said outlet and the other end immersed in the liquid of the consumption tank and arranged to include in said air-trap portion a body of gaseous fluid extending from the top of the trap to the bottom of the open end of the conduit which is immersed in the liquid of the consumption tank, and means for preventing diminution of the body of gas contained within said conduit.

6. In apparatus of the class described, the combination of a supply tank provided with an outlet, the pressure of liquid in said tank being maintained constant at said outlet, a consumption tank the liquid level of which is to be maintained, a sealed conduit having intermediate its length an air-trap portion and having one of its ends connected to said outlet and the other end immersed in the liquid of the consumption tank and arranged to include in said air-trap portion a body of gaseous fluid extending from the top of the trap to the bottom of the open end of the conduit which is immersed in the liquid of the consumption tank, said gaseous fluid being under a pressure substantially equal to the depth of immersion of the open end of said conduit in the consumption tank, the pressure of liquid in the supply tank being suitably maintained in an amount sufficient to force liquid therefrom up to the overflow level of said trap, and means for preventing diminution of the body of gas contained within said conduit.

7. In apparatus of the class described, the combination of a supply tank containing liquid at a prescribed pressure, a consumption tank the level of liquid in which is to be maintained, a conduit provided with an intermediate weir higher than the inlet, and having one end connected to the supply tank and the other end immersed in the liquid of the consumption tank, the said conduit being arranged to include a body of gaseous fluid under pressure to regulate the flow of liquid through said conduit, and means for preventing liquid from flowing down the inside of said conduit into the consumption tank.

8. In apparatus of the class described, the combination of a supply tank containing liquid at a prescribed pressure, a consumption tank the level of liquid in which is to be maintained, a conduit provided with an intermediate weir higher than the inlet, and having one end connected to the supply tank and the other end immersed in the liquid of the consumption tank, the said conduit being arranged to include a body of gaseous fluid under pressure to regulate the flow of liquid through said conduit, and means for preventing liquid from flowing down the inside of said conduit into the consumption tank, and also arranged to deliver liquid into the consumption tank in separated portions.

9. In apparatus of the class described, the combination of a supply tank containing liquid at a prescribed pressure, a consumption tank the level of liquid in which is to be maintained, a conduit having an intermediate weir portion higher than the inlet and connected at said inlet to the supply tank the other end being immersed in the liquid in the consumption tank, said latter end being substantially vertical, and a funnel interposed between the upper part of said conduit and the supply tank for directing the flow of said liquid away from the wall of said conduit.

10. In apparatus of the class described, the combination of a supply tank containing liquid at a prescribed pressure, a consumption tank the level of liquid in which is to be maintained, a conduit having an intermediate weir portion higher than the inlet and connected at said inlet to the supply tank the other end being immersed in the liquid in the consumption tank, said latter end being substantially vertical, and a long-stemmed funnel interposed between the upper part of said conduit and the supply tank for directing the flow of said liquid away from the wall of said conduit and for separating the flow of liquid through said funnel into quantities spaced apart by bubbles of gas.

11. In apparatus of the class described, the combination of a supply tank containing liquid at a prescribed pressure, a consumption tank the level of liquid in which is to be maintained, a conduit having an intermediate weir portion higher than the inlet and connected at said inlet to the supply tank the other end being immersed in the liquid in the consumption tank, said latter end being substantially vertical, and a funnel interposed between the upper part of said conduit and the supply tank for directing the flow of said liquid away from the wall of said conduit, free communication being provided for passage of air from the lower to the upper end of said conduit in addition to the regular funnel opening.

12. In apparatus of the class described, the combination of a supply tank containing liquid at a prescribed pressure, a consumption tank the level of liquid in which is to be maintained, a conduit having an intermediate weir portion higher than the inlet and connected at said inlet to the supply tank, the other end being immersed in the liquid in the consumption tank, said latter end being substantially vertical, and a long-stemmed funnel interposed between the upper part of said conduit and the supply tank for directing the flow of said liquid away from the wall of said conduit and for separating the flow of liquid through said funnel into quantities spaced apart by bubbles of gas, a port being provided through the top of said funnel to permit gas to ascend from the lower end to the upper end of said conduit while the funnel is delivering liquid.

FRANK G. WHEELER.

Copies of this patent may be obtained for five cents each, by addressing the "Commissioner of Patents, Washington, D. C."